No. 689,778. Patented Dec. 24, 1901.
H. R. BARNARD.
GUARD FOR UTENSILS.
(Application filed Feb. 19, 1901.)
(No Model.)
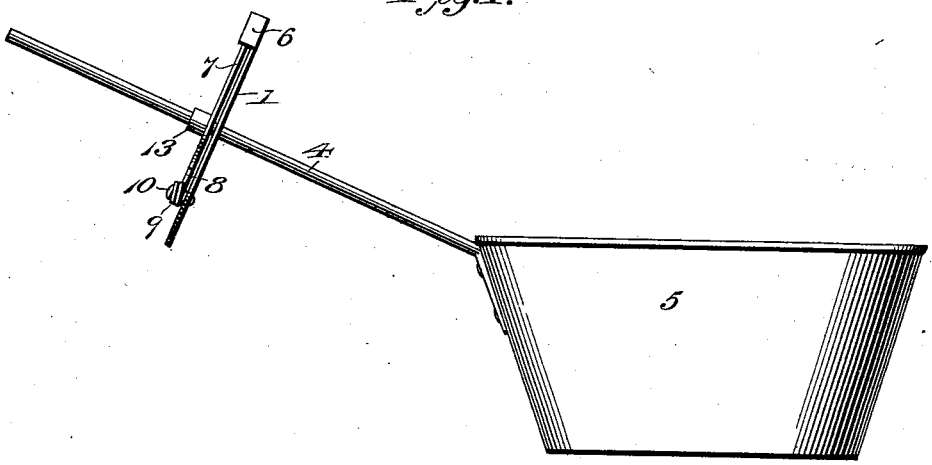
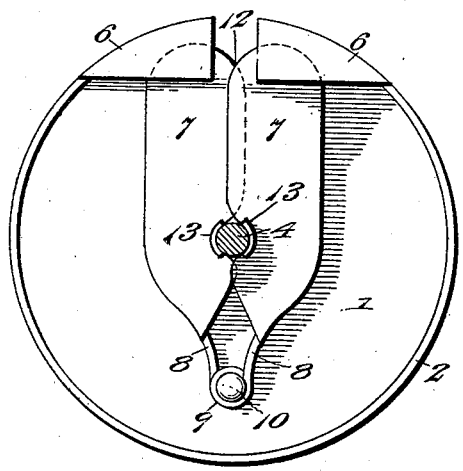 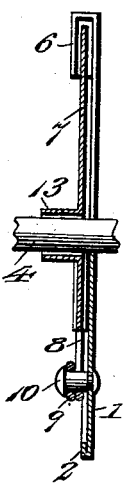 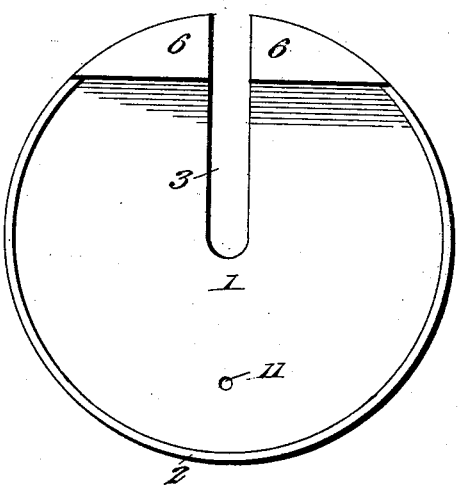
Witnesses
Edwin McKee
H. Schmidt
Inventor
H. R. Barnard
By Victor J. Evans
Attorney

UNITED STATES PATENT OFFICE.

HENRY RICHARD BARNARD, OF NEW YORK, N. Y.

GUARD FOR UTENSILS.

SPECIFICATION forming part of Letters Patent No. 689,778, dated December 24, 1901.

Application filed February 19, 1901. Serial No. 47,940. (No model.)

*To all whom it may concern:*

Be it known that I, HENRY RICHARD BARNARD, a subject of the King of Great Britain, residing at New York city, in the county of New York and State of New York, have invented new and useful Improvements in Guards for Utensils, of which the following is a specification.

This invention relates to guards for cooking utensils, the primary object of the invention being to provide a hand-guard which is adapted to be readily applied to the handle of any cooking utensil for the purpose of protecting the hands from being scalded by flying grease or steam or being scorched by the heat from the fire.

The guard is capable of being quickly removed from one vessel and applied to another, thus making one guard answer the purpose of many and permitting the utensils to be more compactly stored and packed for transportation.

The improved guard may be applied also to forks, toasters, cake-turners, and other implements used in the art of cooking.

With the above and other objects in view the invention consists in the novel construction, combination, and arrangement of parts hereinafter fully described, illustrated, and claimed.

In the accompanying drawings, Figure 1 is an edge view of the guard shown applied to the handle of a cooking utensil. Fig. 2 is a view in elevation of the guard. Fig. 3 is a central vertical cross-section through the same. Fig. 4 is a face view of the body of the guard.

Similar numerals of reference designate corresponding parts in all the figures of the drawings.

The guard comprises, essentially, a body 1, which is preferably in the form of a disk formed of sheet metal and having its periphery turned over to form a strengthening peripheral bead 2, which will also prevent the operator from cutting his hands on the edge of the disk-shaped body. The body 1 is provided with a handle-receiving opening 3, which is preferably in the form of a slot extending from the periphery of the body inward to the center thereof, as shown in Fig. 4, thus enabling the body 1 to be slipped transversely over and from the handle 4 of a cooking utensil 5 of any description. The body 1 is further provided at opposite sides of the opening 3 with keeper-flanges 6, connected to the beaded periphery 2 of the body 1 and extending inward far enough to form guides and keepers for the free ends of a pair of oppositely-arranged shutters 7, located at opposite sides of the opening 3 and adapted to overlap at their inner edges, so as to partially cover the opening, as shown in Fig. 2. The shutters 7 are mounted upon spring-arms 8, which are formed by the terminals of a coil-spring 9, which encircles a stud 10, fixed in an opening 11 in the body 1, said stud being headed to hold the spring in place. The shutters 7, adjacent to their outer ends, have their inner edges flared to form a splayed entrance-throat 12 for the admission of the handle of the cooking utensil, so that by forcing the guard into lateral engagement with the handle the latter will act to force the shutters apart in a manner that will be readily understood.

Adjacent to the center of the device the shutters are provided with flanges forming partial sleeves or sleeve-segments 13, which are adapted to bear against the handle 4 and form a bearing of sufficient length to prevent the guard from twisting upon the handle, thus maintaining the guard in a position at right angles to the handle, as shown in Fig. 1.

From the foregoing description it will be seen that the guard may be readily slipped over the handle of any cooking utensil or other article used in the art of cooking and may be attached to the handle at any desired point in the length thereof; also, that the guard may with equal facility be detached from the handle and applied to the handle of another cooking utensil, thus adapting one guard to answer the purpose of many. The guard effectively prevents the scalding of the hand by flying grease, steam, &c., and also protects the hand from being burned by the heat from the stove.

I do not desire to be limited to the exact details of construction hereinabove set forth, and accordingly reserve the right to change, modify, or vary the construction within the scope of this invention.

Having thus fully described my invention, what I claim as new, and desire to secure by Letters Patent, is—

1. A guard for cooking utensils, comprising a body having a handle-receiving opening, and spring-pressed handle-engaging shutters arranged to partially close the handle-receiving opening.

2. A guard for cooking utensils, comprising a body having a handle-receiving opening, and yielding overlapping handle-engaging shutters arranged to partially close the handle-receiving opening.

3. A guard for cooking utensils, comprising a body having a handle-receiving opening, handle-engaging shutters arranged to partially close the handle-receiving opening, and a shutter-actuating spring common to both shutters.

4. A guard for cooking utensils comprising a body having a handle-receiving opening, and handle-engaging shutters arranged to partially close the handle-receiving opening, and provided with oppositely-arranged sleeve-segments.

5. A guard for cooking utensils, comprising a body having a handle-receiving opening, handle-engaging shutters arranged to partially close the handle-receiving opening, and keeper-flanges beneath which the free ends of the shutters move.

6. A guard for cooking utensils, comprising a disk-shaped body having a handle-receiving opening, oppositely-arranged handle-engaging shutters adapted to partially close the handle-receiving opening, and reversely-disposed sleeve-segments on the shutters forming an elongated sleeve-bearing for the handle of a cooking utensil.

In testimony whereof I affix my signature in presence of two witnesses.

HENRY RICHARD BARNARD.

Witnesses:
ERNEST W. CANNING,
FREDERICK WILLIAM BARNARD.